July 13, 1937.  I. E. PHILLIPS  2,087,043
EDUCATIONAL APPLIANCE
Filed Aug. 25, 1936  2 Sheets-Sheet 1
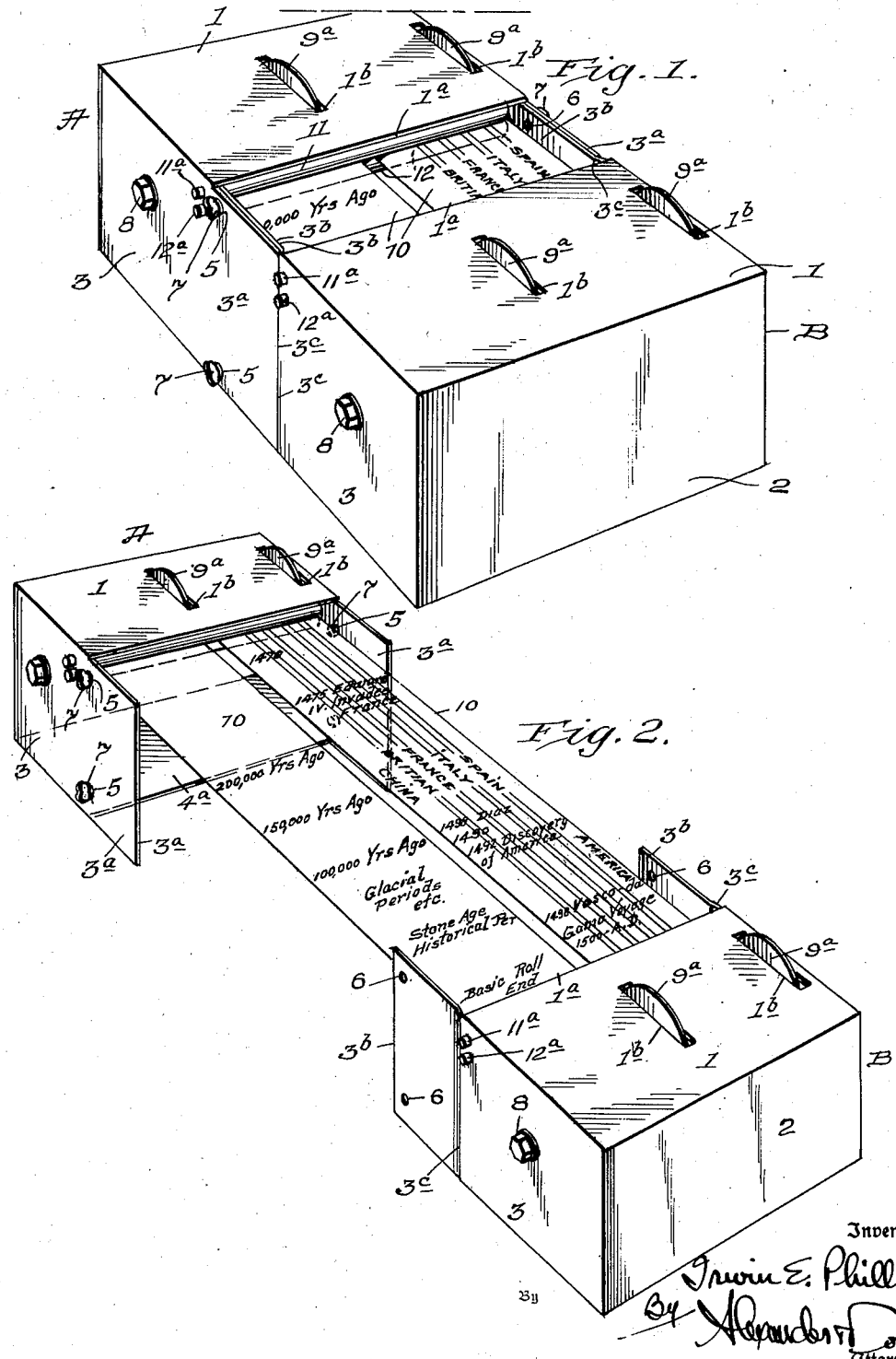
Inventor
Irwin E. Phillips
By
Attorneys

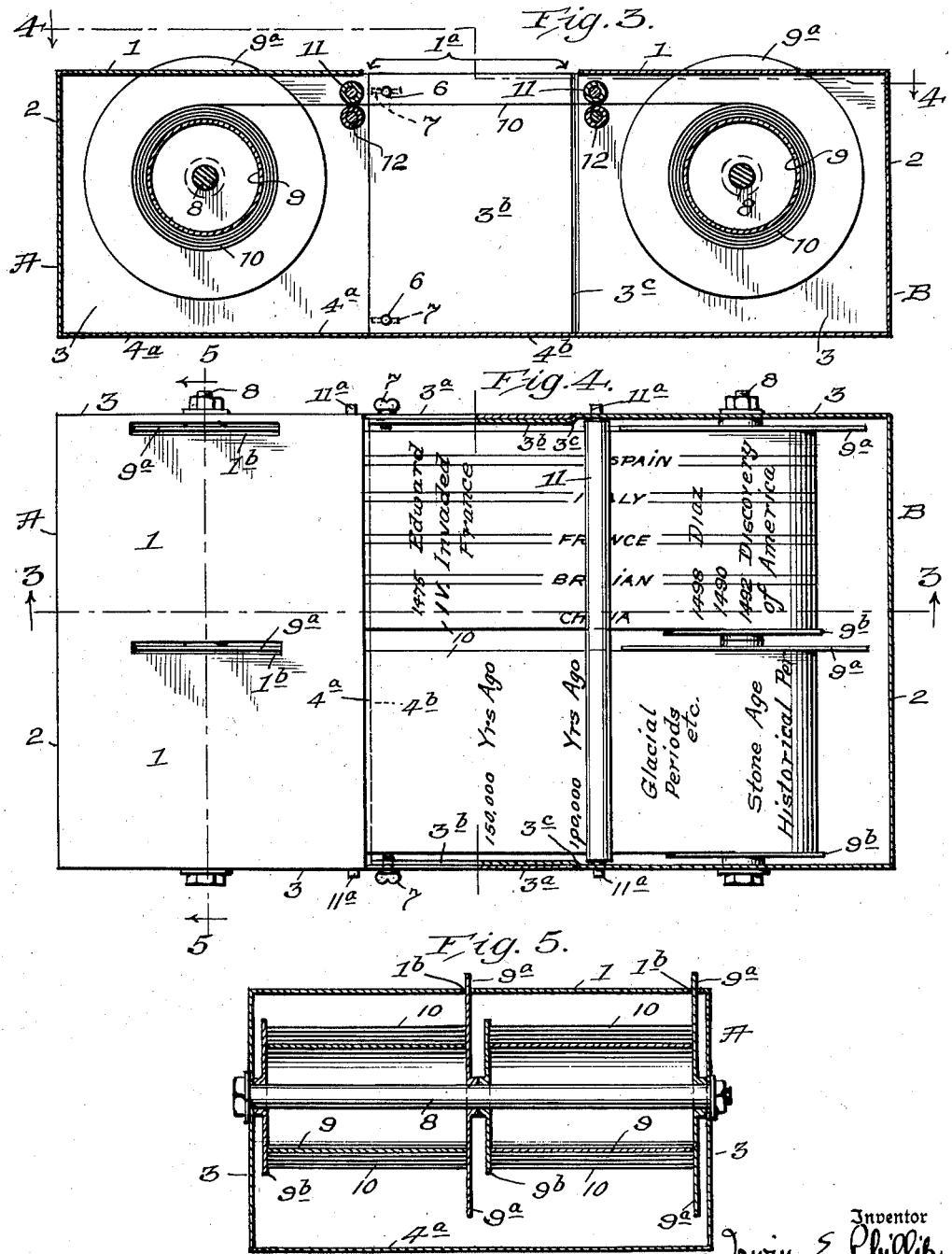

Patented July 13, 1937

2,087,043

UNITED STATES PATENT OFFICE 2,087,043

EDUCATIONAL APPLIANCE

Irwin E. Phillips, Greeneville, Tenn.

Application August 25, 1936, Serial No. 97,821

16 Claims. (Cl. 35—21)

This invention is a novel educational appliance especially adapted for use in the study of history, natural history, anthropology, geology, and other historical subjects, same consisting of a casing formed of two sections, each of which carries spools upon which are mounted tapes carrying chronologically arranged data or information, a portion of the tapes being visible through an opening in the top of the casing, and the spools being operated by the fingers, one at a time, intentionally forcing the student to visualize only a given portion of the tapes at any one turning.

The principal object is to provide an appliance which may be utilized to give students of history, natural history, anthropology, geology, or other historical subjects a conception of the subject that cannot be obtained by the use of text books alone, which obviously only give word-pictures. Charts aid in giving visual conceptions, and thus my invention combines both, in that it stimulates the word-perception centers of the student's brain; stimulates the color-perception centers; and in addition, by causing the student to use his hand in turning the spools, it adds tactile and muscle-sense perceptions. The combined result is a conception of the subject much more complete than if the student actually confined his study to the printed word, since he is forced to pass over periods (as he must pass through life) a few years at a time, with each year as long as the next, causing him to actually feel that he has passed through such period, thereby enabling him to perceive the relative lapse of time involved in the various phases, as well as their relationship to other periods. My invention will also aid him in recalling approximate dates, which in many instances is more important than the exact dates.

Another object of the invention is to provide means for detachably connecting the sections of the casing together to form a unitary casing, said means when disengaged permitting the sections to be spaced apart to permit extension of the tapes so that the entire lengths of same, which may be 50 or 100 feet or any portion thereof, may be viewed as a whole in order that the significance or relation of one time period may be seen in its relation to other such periods.

Other minor objects of the invention will be hereinafter set forth.

I will explain the invention with reference to the accompanying drawings which illustrate one practical embodiment thereof to enable others to adopt and use the same; and will summarize in the claims the novel features of construction, and novel combinations of parts, for which protection is desired.

In said drawings:—

Fig. 1 is a perspective view of my educational appliance, showing the sections of the casing connected together, thereby providing an opening of relatively short length in the top thereof through which the data bearing tapes are visible.

Fig. 2 is a reduced perspective view, similar to Fig. 1, but showing the sections of the casing separated to expose much greater lengths of the tapes.

Fig. 3 is a section on the line 3—3, Fig. 4.

Fig. 4 is a section on the line 4—4, Fig. 3.

Fig. 5 is a section on the line 5—5, Fig. 4.

As shown, the educational appliance consists of a casing formed of two complemental sections A and B formed of sheet metal or other suitable material, each of which sections comprises a top plate 1, an outer end plate 2, opposite side plates 3, and bottom plates. The side plates of the sections A, B, have flanges 3a, 3b, respectively, adapted to overlap when the sections are assembled as shown in Fig. 1, the flanges 3b of section B being slightly joggled inwardly as shown at 3c in Figs. 1 and 2 so as to fit within the flanges 3a of section A when the sections are assembled.

The bottom plate 4a of section A terminates at the inner end of the flanges 3a (Fig. 2) while the bottom plate 4b of section B terminates at the outer end of the flanges 3b, whereby when the sections are assembled as in Fig. 1, the bottom sections 4a, 4b will together cover the bottom of the casing.

The tops 1 of the sections extend only to the inner ends of flanges 3a, 3b so that when the sections are assembled, as shown in Fig. 1, an opening 1a is provided substantially at the center of the top thereof, extending across the entire width of the casing, the length of the opening being equal to the length of the overlapping flanges 3a, 3b; said opening 1a being provided for the purpose hereinafter described.

Adjacent the inner end of flanges 3a adjacent the upper and lower edges thereof are perforations 5 adapted to register with tapped bores 6 adjacent the upper and lower edges of the outer ends of flanges 3b, said perforations and tapped bores receiving screws 7, which may be small thumb screws, whereby sections of the casing may be securely locked together. Screws 7 however may be readily removed to permit the sections to be separated, as in Fig. 2.

Extending through the sides 3 of each section A, B, is a shaft 8, preferably a bolt 8 having a head on one end and a nut on the other end embracing the sides of the casing, and rotatably mounted on each shaft 8 are one or more spools 9 upon opposite or corresponding pairs of which are wrapped tapes 10. Each spool 9 is provided with a large disc 9a at one end the periphery of which is adapted to extend through slot 1b in the top 1 of its related section, whereby the spool may be digitally operated by the finger of the student. Each disc 9a may if desired be serrated at its edges, or corrugated, or covered with rubber at its periphery which extends through the slot 1b in the top of the casing. At the opposite end of each spool 9 is a smaller disc 9b entirely housed within the section and adapted to properly align tape on its spool while being wound.

At the upper inner corners of the sides 3 of each section is a pair of contacting rolls 11, 12 having reduced ends 11a, 12a journaled in perforations in the opposite sides 3 of the sections, the rolls 11 acting as guides for the tapes 10 which pass between the pairs to hold the tapes so that the portions embraced by the opening 1a in the casing are held up close to the top of the casing, in order to be clearly visible through the said opening. As the twin rolls 11, 12 impinge on each other, same create a resistance to the progress of the tapes 10 through the casing, thus enabling the tapes which are being wound to be wrapped snugly on their respective spools 9.

The tapes 10 contain any desired printed and/or illustrated matter of a historical nature so arranged thereon that it corresponds to a definite time scale. For instance, each foot length of what might be termed the basic tape will represent a certain number of years, one or more million. It will include all geologic time as at present estimated. Subsequent tapes representing chosen phases of history would also be arranged according to scale; for instance, one tape might include only the historical period. Each age or period may be illustrated with items characteristic of that period. Each section of the tape may have its individual color. On the one containing the historical period, each nation or people may be followed through with a certain color scheme of bands or lines. To illustrate: if one foot represents 100 years on the tape representing the historical period, then, if we start with 1936, we would put our information concerning 1836 twelve inches removed therefrom. A nation which had an existence of 200 years would have a band only two feet long.

By the above construction, the sections A and B of the casing may be locked together by thumb screws 7 as in Fig. 1, to provide a sight opening 1a on the top so that relatively short lengths of tapes 10 are visible. When, however, it is desired to view a greater tape length to compare the period as a whole with respect to others, the screws 7 may be removed and the two sections A and B separate the desired distance apart, while maintaining same in axial relation, as shown in Fig. 2.

I claim:

1. An educational appliance comprising casing sections adapted when assembled to form a casing having an opening in one face; spools rotatably mounted in each section on axes transverse to the axis of the casing; means for rotating the spools; data bearing tapes adapted to be wound and unwound from the spools in opposite sections with their runs displayed through the opening; and means for detachably connecting the sections together, said sections when detached being axially displaceable to disclose increased portions of the runs of the tapes.

2. In an appliance as set forth in claim 1, said sections being open at their adjacent faces, and when assembled forming a casing closed on all sides except for the said opening in said one face.

3. In an appliance as set forth in claim 1, said sections each comprising top members, side members, outer end members, and bottom members; said sections being open at their adjacent faces, and when assembled forming a casing closed on all sides except for the said opening in said one face.

4. In an appliance as set forth in claim 1, said connecting means comprising oppositely extending flanges on the respective sections adapted to overlie one another when the sections are assembled; and removable members connecting the flanges together and maintaining the sections in alignment.

5. An educational appliance comprising casing sections adapted when assembled to form a casing having an opening in one face; spools rotatably mounted in each section on axes transverse to the axis of the casing; said spools being digitally operated and having portions extending through the casing; data bearing tapes adapted to be wound and unwound from the spools in opposite sections with their runs displayed through the opening; and means for detachably connecting the sections together, said sections when detached being axially displaceable to disclose increased portions of the runs of the tapes.

6. In an appliance as set forth in claim 5, said sections being open at their adjacent faces, and when assembled forming a casing closed on all sides except for the said opening in said one face.

7. In an appliance as set forth in claim 5, said sections each comprising top members, side members, outer end members, and bottom members; said sections being open at their adjacent faces, and when assembled forming a casing closed on all sides except for the said opening in said one face.

8. In an appliance as set forth in claim 5, each of said spools having a disk at one end extending through a slot provided therefor in the casing; and having a smaller disk at the other end entirely housed within the section.

9. In an appliance, as set forth in claim 5, said connecting means comprising oppositely extending flanges on the respective sections adapted to overlie one another when the sections are assembled; and removable members connecting the flanges together and maintaining the sections in alignment.

10. An educational appliance comprising casing sections adapted when assembled to form a casing having an opening in one face; spools rotatably mounted in each section on axes transverse to the axis of the casing; said spools being digitally operated and having portions extending through the casing; data bearing tapes adapted to be wound and unwound from the spools in opposite sections; means for maintaining the runs of the tapes adjacent the casing opening; and means for detachably connecting the sections together, said sections when detached being axially displaceable to disclose increased portions of the runs of the tapes.

11. In an appliance as set forth in claim 10, said sections being open at their adjacent faces, and when assembled forming a casing closed on all sides except for the opening in said one face.

12. In an appliance as set forth in claim 10, said sections each comprising top members, side members, outer end members, and bottom members; said sections being open at their adjacent faces, and when assembled forming a casing closed on all sides except for the said opening in said one face.

13. In an appliance as set forth in claim 10, each of said spools having a disk at one end extending through a slot provided therefor in the casing; and having a smaller disk at the other end entirely housed within the section.

14. In an appliance as set forth in claim 10, said maintaining means comprising a pair of rolls journaled in each section adjacent the opening between which pair the tapes run.

15. In an appliance as set forth in claim 10, said maintaining means comprising pairs of rolls journaled in the sections adjacent the opening between which pairs the tapes run; said rolls of each pair impinging to set up resistance toward movement of the tapes whereby the latter when being wound will be wrapped tightly on their respective spools.

16. In an appliance as set forth in claim 10, said connecting means comprising oppositely extending flanges on the respective sections adapted to overlie one another when the sections are assembled; and removable members connecting the flanges together and maintaining the sections in alignment.

IRWIN E. PHILLIPS.